(12) United States Patent
Malhi

(10) Patent No.: US 6,943,769 B1
(45) Date of Patent: Sep. 13, 2005

(54) DISPLAY DEVICE FOR PORTABLE NOTEBOOK COMPUTER

(75) Inventor: Satwinder Malhi, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1292 days.

(21) Appl. No.: 08/566,234

(22) Filed: Dec. 1, 1995

(51) Int. Cl.[7] .................................................. G09G 3/18
(52) U.S. Cl. ..................... 345/102; 345/901; 349/65; 349/67; 361/681
(58) Field of Search ............................. 361/679–683; 349/67, 61, 42, 65, 62, 58, 63; 362/31, 296, 341; 364/708.1; 345/169, 901, 905, 102

(56) References Cited

U.S. PATENT DOCUMENTS

| | | | | |
|---|---|---|---|---|
| 3,881,807 A | * | 5/1975 | Hosokawa et al. ........... | 349/58 |
| 4,470,667 A | * | 9/1984 | Okubo et al. | |
| 4,635,128 A | * | 1/1987 | Toyoda ....................... | 340/784 |
| 4,914,553 A | * | 4/1990 | Hamada et al. ............... | 349/65 |
| 5,091,873 A | * | 2/1992 | Araki ....................... | 364/708.1 |
| 5,146,354 A | * | 9/1992 | Plesinger ..................... | 349/65 |
| 5,260,867 A | * | 11/1993 | Maeser et al. ........... | 364/708.1 |
| 5,400,055 A | * | 3/1995 | Ma et al. .................. | 364/708.1 |

* cited by examiner

*Primary Examiner*—Lun-Yi Lao
(74) *Attorney, Agent, or Firm*—Ronald O. Neerings; Wade James Brady, III; Frederick J. Teleky, Jr.

(57) ABSTRACT

A portable computer having a display unit coupled to a base. The display unit includes an exterior display case, a screen, one or more liquid crystal display (LCD) panels, display electronics and a light source. The light source is a tubular shaped lamp which extends along a length of the display case and is held in place by a harness at one end of the display case. A section of the display case is an independently movable reflector, coated with a light reflective mirrored finish that distributes light evenly along the LCD panel surface. The computer has a storage mode and an active mode. When in active mode, the reflector is inclined and light from the light source reflects unto the LCD panel within the case. In storage mode, the reflector is closed and no light is reflected unto the LCD panel.

25 Claims, 4 Drawing Sheets

DISPLAY DEVICE FOR PORTABLE NOTEBOOK COMPUTER

TECHNICAL FIELD

The present invention relates in general to an improved portable computing device and, in particular, to a portable computer system with a display unit having a retractable inclining reflector which replaces the bulkier and heavier light guides used with prior art systems.

BACKGROUND OF THE INVENTION

Without limiting the scope of the invention, its background is described in connection with a portable notebook computer system having display unit that includes a display case, display screen, one or more Liquid Crystal Display (LCD) panels and a light source.

The increased demand for portable computing devices, such as laptop and notebook computers, has resulted in a proliferation of technical advances and breakthroughs designed to increase system functionality, performance and convenience. Many of these advances have focused on making the portable compute small, thin and lightweight. Today's computer user, however, demands systems that are more compact, thinner and lighter than ever before.

The obstacles faced by designers in reducing system size and weight relate in large part to the number and types of devices and components options typically found in the more sophisticated fully featured computers. For example, users now demand high resolution graphic color LCDs, high density and high data rate mass storage devices, Integrated Memory Modules, removable diskette drives, spare battery cells and full-sized keyboards.

While many of these components have seen dramatic size and weight reductions over the years, such options still account for a major portion of the system's overall size and weight. Moreover, as users demand more functional and sophisticated systems, the push to miniaturize components becomes greater.

Recently, manufacturers have turned to more creative methods of reducing system size and weight. For example, manufacturers have begun using newer and more efficient designs, higher density Printed Circuit Boards (PCB) and assemblies that package more components in the available system space. Still others employ Application Specific Integrated Circuitry (ASIC) to combine system functions and thereby reduce overall component count. All such methods have been effective to some extent in reducing the physical dimensions and weight of the portable computer.

A subsystem that contributes greatly to overall system size and weight is the computer's display unit. The display unit typically combines a display case, LCD panel, light source, display electronics and other components necessary to provide image output capabilities. The typical display unit on today's portable computer is approximately 0.5 inch thick and weighs 360 grams or more.

While many of the reductions in size and weight have focused primarily on decreasing the physical dimensions of the computer's PCB assembly and component options, little or no attention has been paid to the system's display unit. In this regard, an improvement on present portable computing devices that reduces the overall system's physical dimension and weight characteristics without sacrificing display functionality would be a great advantage.

SUMMARY OF THE INVENTION

The recent advances in portable computing technology and the move towards lighter and more compact systems has created a need for an improved portable computing device with a compact, thin and lightweight display. Standard system designs that were once breakthrough have become outdated as users depend on their portable computer systems for tasks previously reserved for larger desktop systems. Today users want a lightweight portable system that is fully functional and easy to carry.

Accordingly, it is a principle object of the present invention to provide an improved portable computer system with a decreased size and weight as compared to the prior art systems which emphasizes a reduction in the thickness of the display case. In this regard, an improved display unit is described that dramatically reduces the weight of the lighting system within the computer's primary display unit.

Yet another object of the present invention is to provide a portable computer system with a lightweight thin profile display unit that is clear, bright and fully functional. In this regard, the back cover of the display case is made reflective to eliminate bulky light guides now used in most prior art systems. The thickness and weight of the display unit are reduced dramatically thereby reducing the physical dimensions of the overall system.

Disclosed is a portable computing device having a display unit coupled to a base which opens and closes to form an enclosure for housing a plurality of computing components. The display unit comprises a display case which contains an LCD panel, display electronics and a light source. The light source is a tubular shaped lamp which extends along one side of the display case and is held in place by a harness at one end. The inner surface of the display case is coated with a light reflective mirrored finish which takes light input from a line light source and distributes it evenly on the LCD panel surface area.

The portable computer has a storage and an active mode. In one embodiment, the computer is in active mode when the reflector is lifted to an inclined position above the display unit and light from the light source reflects from the reflector unto an LCD panel within the display case. In storage mode, the reflector is closed and no light shines on the LCD panel and the thickness of the display case is reduced.

A control mechanism, such as a lever or push-button, can be used to automatically control the motion of the reflector when the computer is opened and closed. Alternatively, the user can simply lift the reflector to its inclined position prior to use.

For a more complete understanding of the present invention, including its features and advantages, reference is now made to the following detailed description, taken in conjunction with the accompanying drawings.

DETAILED DESCRIPTION OF THE PREFERRED EMBODIMENT

Figure 1:
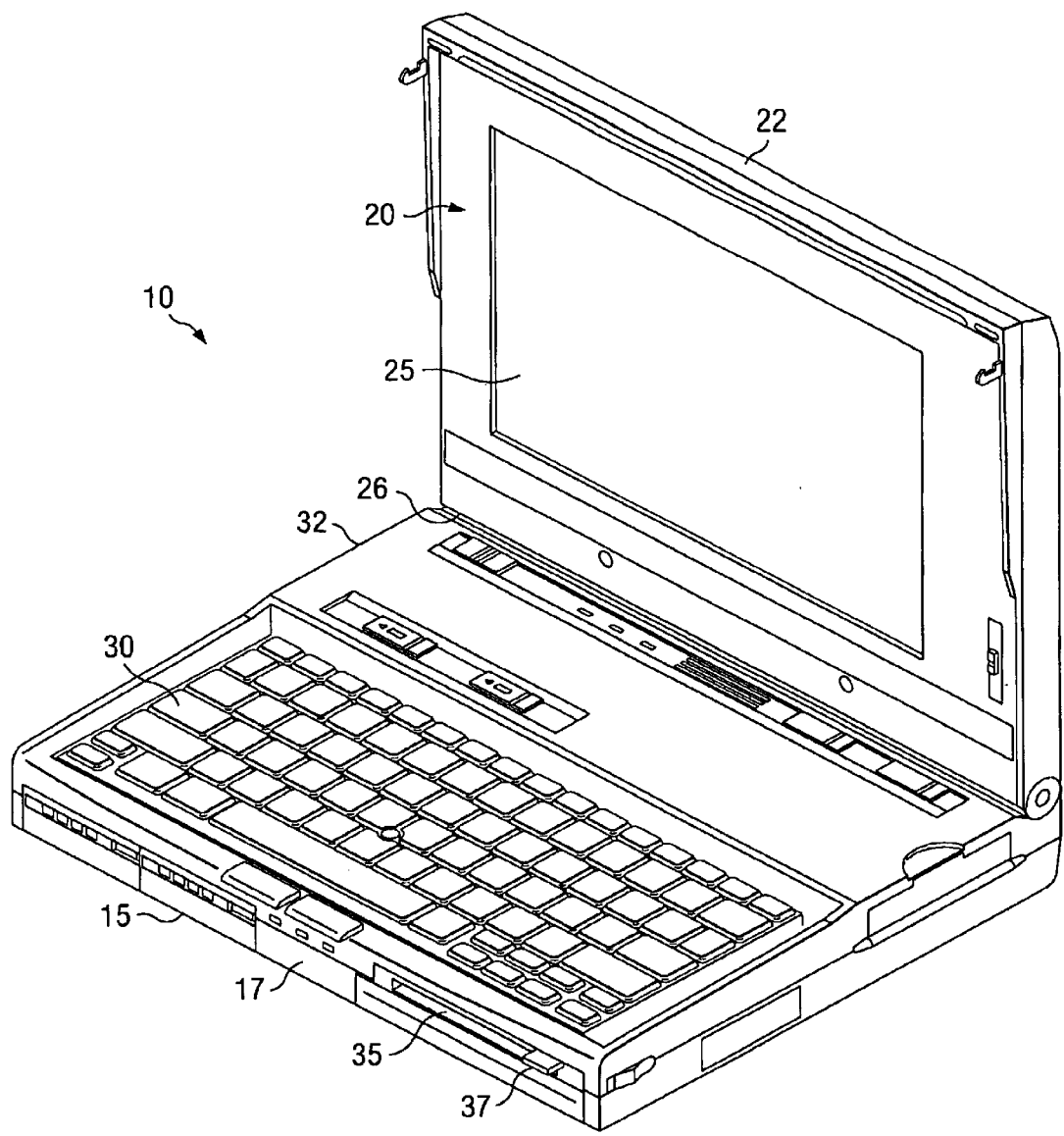
FIG. 1 shows a complete portable notebook computer with display.

In reference to FIG. 1, a portable computing device in the form of a portable notebook computer is shown and denoted generally as 10. The portable notebook computer 10 has a base 15 for housing all of the various computer options, devices and components depending on the system configuration, features and functionality.

For example, portable notebook computer 10 has a diskette drive 35 accessible from the base front 17 of base 15. Also, button 37 protrudes from the base front 17 allowing the user to operate the insertion and/or removal of disks from diskette drive 35. Other options such as internal modems, hard disk drives, memory boards, PCMCIA cards and others may also be contained within base 15. A keyboard 30 is also provided as an input means.

As shown, base 15 is coupled to a display unit 20 about a spine 26. The display unit 20 comprises the display components and devices needed to permit visual representation of data and information to the user on screen 25. The base 15 forms a substantially rectangular enclosure for housing a plurality of computing components. The display unit 20 forms a substantially rectangular enclosure for housing a plurality of display components. Display unit 20 comprises a case 22 which in the preferred embodiment is made of a tough acrylic or polyurethane material capable of withstanding cracking or fading. Case 22 is used to house all of the display unit 20 components which are necessary to provide screen 25 output capabilities.

Screen 25 of the portable notebook computer 10 is fixed to the front of the case 22 and forms a substantially flat viewing surface providing a wide-open view of the data and information presented to the user. In the preferred embodiment screen 25 is made of a clear see through material and comprises a flat surface area approximately 6" by 8" inches (9.5" diagonal). It should be understood that screen 25 may be of other sizes and dimensions. The properties of screen 25 permit light generated from within display unit 20 to be perceived by the user.

The spine 26 of the portable notebook computer 10 is maintained near the rear 32 of base 15. In one embodiment, the spine 26 comprises a tubular shaped structure that extends the entire length of the portable notebook computer 10 along display unit 20 and forms a rotatable support to which base 15 and display unit 20 are attached. In this way, display unit 20 can be rotated about base 15 along an axis perpendicular to spine 20 for closing and opening the portable computer notebook 10. While in use, for example, the user can rotate the display unit 20 away from base 15 along spine 26 to expose screen 25. Likewise, the user can close the computer 10 by rotating the display unit 20 towards the base. A locking mechanism can be provided to keep the display unit 20 in a fixed location with respect to the base 15.

Figure 2:
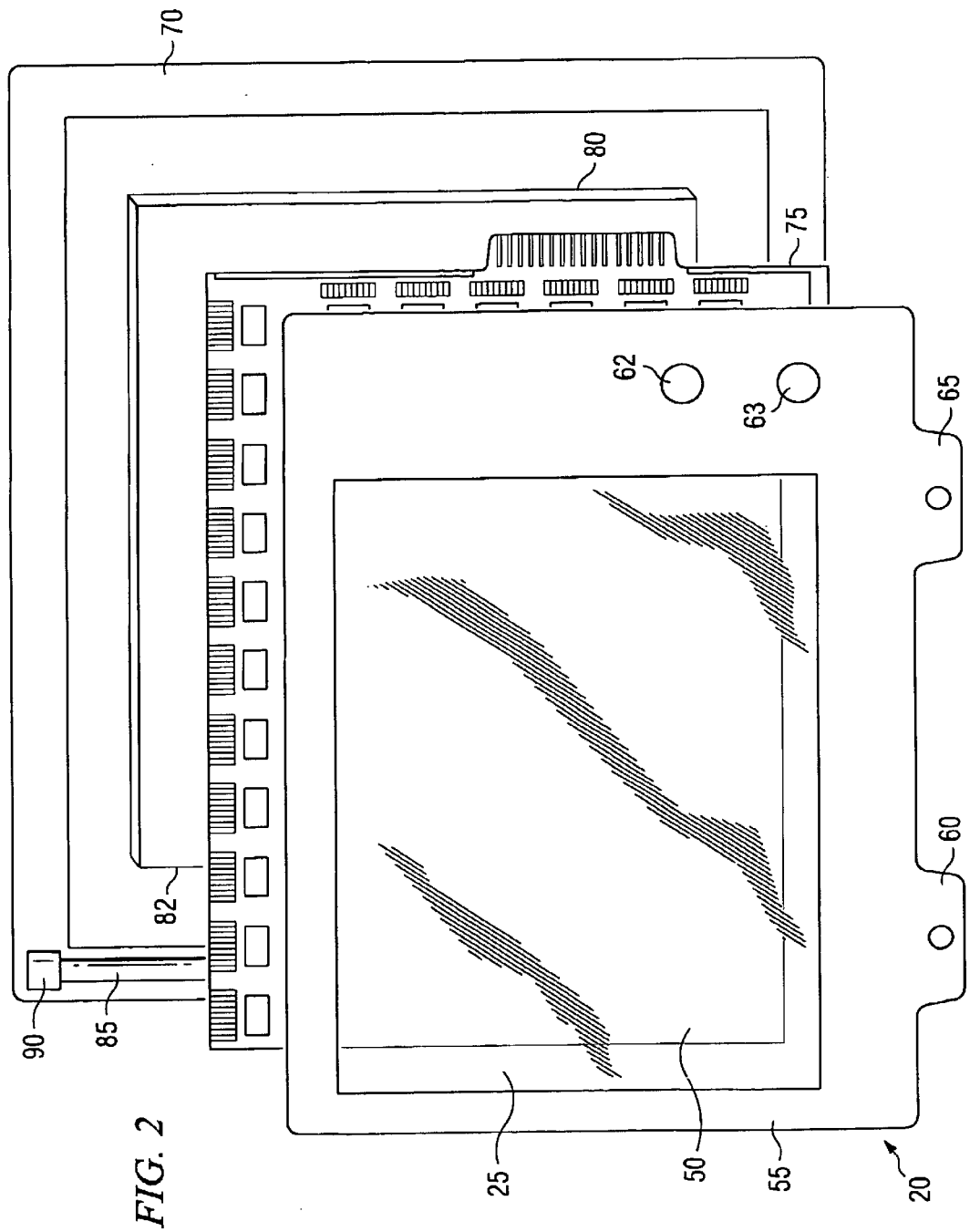
FIG. 2 shows the display unit assembly for a portable notebook computer.

Turning now to FIG. 2, a detailed view of an existing display unit 20 assembly is shown and denoted generally as 50. The display case front 55 holds screen 25 in place. In one embodiment, the case front 55 is made of a resilient polyurethane material capable of withstanding fading, cracking and shock.

Fastener 60 and fastener 65 secure the case front 55 to the case back 70 to form a self-enclosed housing for all of the various components found in display unit 20. Fastener 60 and fastener 65 also brace the display unit 20 to the portable notebook computer 10 about spine 26 for coupling the base 15 to the display unit 20.

Behind the case front 55 is the display board 75 in the form of one or more Printed Wiring Board (PWB) assemblies. Display board 75 contains the various display electronics including any components, circuits, devices, wiring and leads used by the system to perform the system's display functions. Examples of such display electronics include resistors, capacitors, diodes, logic arrays, printed circuits, surface mounts, chips and others.

The display board 75 fits within the area defined by the case front 55 and case back 70. The display electronics are of various heights and sizes, but also fit within the area between the case front 55 and the case back 70. In one embodiment, the PWB assemblies forming the display board 75 are connected to the LCD panel 50 to form a single display layer that fits within the area between the case front 55 and the case back 70.

Also shown in FIG. 2 is a light guide 80 positioned between the display board 75 and the case back 70. In one embodiment, the light guide 80 is made of an acrylic polyurethane material approximately 0.2" inches thick and coated with a white sheet of light reflective material. Light guide 80 works in conjunction with light source 85 to disperse light evenly along the surface of the LCD panel 50. The area between the LCD panel 50 and the case back 70 holds light guide 80.

In operation, light guide 80 is used to capture light that enters along any edge of light guide 80 and disperse it evenly along its surface. In this way, light received from light source 85 is dispersed in a substantially even manner along the entire LCD panel 50 surface area.

In the one embodiment, light source 85 is a tube shaped cold cathode fluorescent lamp approximately 7.5 inches long and 0.4 mm in diameter. As shown, light source 85 has a cap 90 which supports the light source 85 in place on the case back 70.

In operation, light emitted from light source 85 enters the light guide 80 along a side edge such as edge 82. The reflective material of the light guide 80 captures the emitted light and distributes it evenly across its surface. Being parallel to the light guide 80, LCD panel 50 receives the light from the light source 85 causing the screen 25 to illuminate. The display board 75 controls the display intensity of the light on LCD panel 50 across individual display pixels (not shown) depending on the data and/or information to be shown.

Thus, the light guide 80, light source 85, LCD panel 50 and display board 75 are used in this way to display data and information to the user via screen 25. The user can vary the intensity of light source 85 via control 62 and/or control 63. For example, the brightness and contrast of screen 25 can be adjusted with control 62 and/or control 63.

Figure 3:
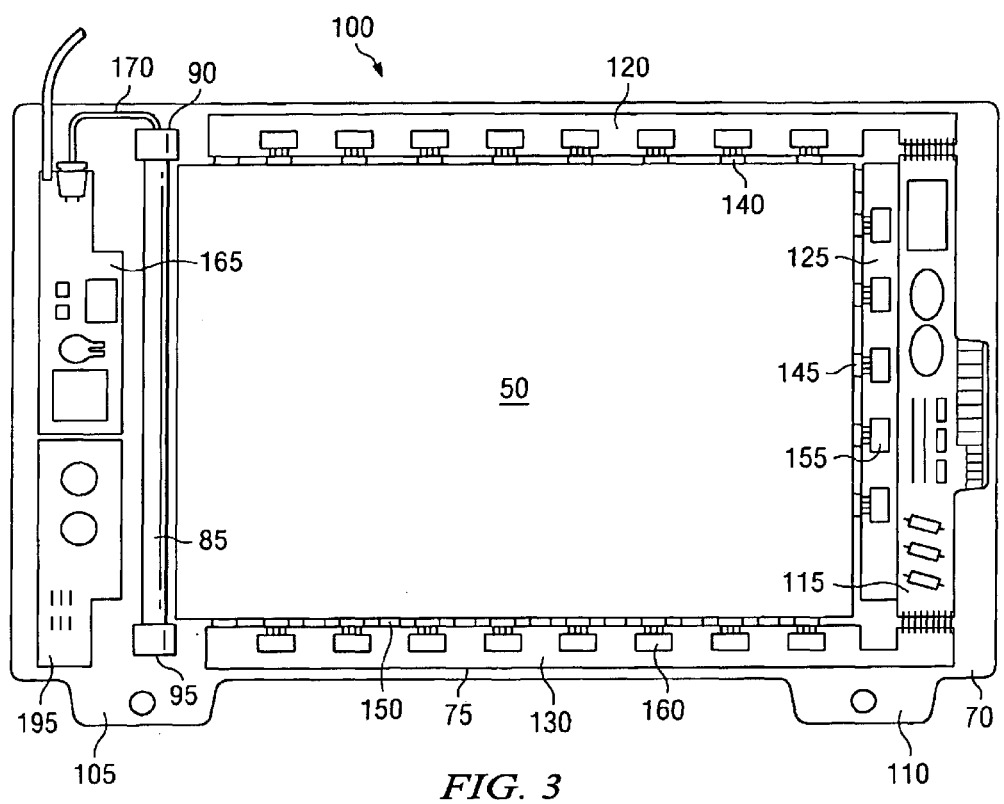
FIG. 3 shows the screen assembly found in the display unit of a portable notebook computer.

Turning now to FIG. 3, a detailed view of the screen assembly is shown and denoted generally as 100. Fastener 105 and fastener 110 are coupled to the case back 70 and joined with fastener 60 and fastener 65, respectively, to secure the case front 55 to the case back 70. When secured in this fashion, case front 55 and case back 70 form a self-enclosed housing for all the various components within the display unit 20.

In the embodiment shown, the display board 75 comprises the display circuits 115, PWB 120, PWB 125, and PWB 130. PWB 120, PWB 125 and PWB 130 contain a plurality of display chips used to control the display characteristics of individual pixel locations on the LCD panel 50. Interface 140, interface 145 and interface 150 are used to connect the PWB 120, PWB 125 and PWB 130, respectively, to the LCD panel 50.

In reference to PWB 125, FIG. 3 shows that integrated chips 155 are provided to perform the various logic functions necessary to drive designated pixel groups of LCD panel 50. PWB 125 has an interface 145 to the LCD panel 50. The length of PWB 125 is approximately that of LCD panel 50. The width of PWB 125 limits the horizontal width of LCD panel 50 since the entire assembly 100 must fit within the enclosed area of display unit 20. It should be understood that other sizes and dimensions may be employed.

Likewise, PWB 130 has an interface 150 to the LCD panel 50 for driving portions of the display screen. Integrated chips 160 are located on PWB 130 for driving designated pixel portions of the LCD panel 50. As shown, PWB 110 limits the vertical length of LCD panel 50 to provide room for the various display components within display unit 20.

A power board 165 provides energy to the light source 85 via lead 170. In practice, the power board 165 may take the form of a miniaturized power supply coupled to the system's main power supply in the base 15. Power board 165 provides the electrical energy for the LCD panel 50 of the display unit 20. As shown, lead 170 joins the light source 85 to the power board 165. Cap 90 and cap 95 support the light source 85 to the case back 70.

A display control board 195 is also provided for varying the display characteristics of the LCD panel 50. As shown, display circuits 115, PWB 120, PWB 125, PWB 130, power board 165 and display control board 195 all surround LCD panel 50 and require considerable amounts of space within the display unit 20. The weight and thickness of display unit 20 is increased with display circuits 115, PWB 120, PWB 125, PWB 130, power board 165 and display control board 195.

Figure 4:
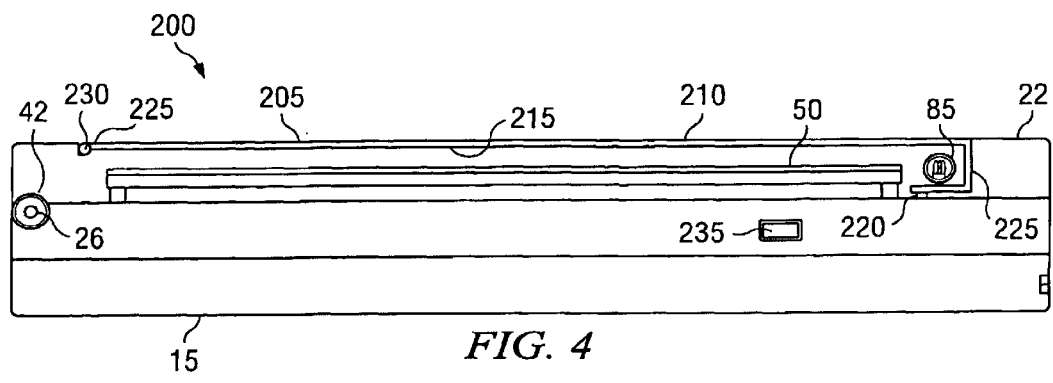
FIG. 4 depicts the storage mode of a portable notebook computer in accordance with the preferred embodiment of the present invention.

Turning now to FIG. 4, a side view of the portable notebook computer in storage mode is shown and denoted generally as 200. As before, the base 15 and the display case 22 are coupled together about the hinge 42 and spine 26. In the embodiment shown, the display case 22 is the same length as the base 15.

The top surface of display case 22 is segmented; having an perimeter frame portion that is contiguous with the rest of case 22, and an optionally removable medial "window" portion coupled to the perimeter frame portion as described below. The medial portion is reflector 205, which forms a substantially flat portion of the display case 22 and is parallel with a cross plane of the base 15. In this configuration, the portable notebook computer 10 is in a storage mode.

The reflector 205 has a top surface 210 which in one embodiment is made of the same material as the display case 22. It should be understood, however, that other materials may be used to construct reflector 205.

The reflector 205 also has a bottom surface 215, parallel to its top surface 210, and contained entirely within the display case 22. The bottom surface 215 of the reflector 205 is coated with a reflective mirrored finish that reflects luminescent light from the light source 85. While no particular type of coating material is essential to the invention, bottom surface 215 is finished in such a way as to allow light to be evenly distributed throughout bottom surface 215.

As shown, in the preferred embodiment LCD panel 50 is maintained substantially parallel to the reflector 205 in the storage mode. It should be understood, however, that other configurations of the LCD panel 50 are possible as long as image output capabilities are enabled during use. Reflector 205 is coupled at its bottom end 225 to the. display case 22 by any of a variety of means. For example, a hinge, bezel, joint, splice or other similar mechanism may be used to couple the reflector 205 to the display case 22.

In the preferred embodiment, display case 22 houses a selectively fixable hinge 230 coupling the bottom end 225 of reflector 205 to the display case 22. Hinge 230 permits angular motion of the reflector 205 with respect to display case 22. While no particular form of hinge 230 is essential to the invention, hinge 230 may take the form of a bracket, extender, brace or similar device to which the reflector 205 can be secured. In this way, hinge 230 can OPEN/CLOSE or extend in such a way that the reflector 205 can be angled about one end of the display case 22.

A push-button 235 is shown coupled to the base 15 for automatically controlling the motion of the reflector 205 about the display case 22. It should be understood that push button 235 may be placed elsewhere on the portable notebook computer 10 without departing from the true spirit of the invention. In operation, a user depresses push-button 235 when ready to use the portable notebook computer 10 to cause the reflector to extend outward from the display case 22. In one embodiment, push-button 235 is internally connected to the reflector 205 and comprises a mechanical lifting device that controls the angular motion of the reflector 205 about hinge 230.

While the light source 85 is shown positioned along the upper edge portion of the display case 22, it should be understood that the light source 85 may be placed along any display case 22 edge as long as light emitted from the light source 85 is adequately delivered to the bottom surface 215 of reflector 205 when in use.

Also, display case 22 houses a selectively fixable support 220, coupling reflector 205 to a harness which holds the light source 85 in place. Support 220 is provided for controlling the motion of reflector 205 and can extend to support the reflector 205 as it is rotated angularly. It should be understood that support 200 may comprise a variety of mechanisms, such as a push-button, bracket or similar apparatus may be used to support the reflector 205 during motion.

The reflective coating on the bottom surface 215 of the reflector 205 replaces the functionality of the light guide 80 used in prior art systems.

Reflector 205 thus dually functions as a part of a computer's exterior casing and as an active part of the display apparatus. Since no light guide 80 is used in the illustration of FIG. 4, the overall thickness and weight of the display unit 20 is reduced significantly.

It should be understood by one skilled in the art that the display case 22 may optionally be removed from the base 15 and placed on a projector so that data or information on screen 25 can be seen as images on an overhead projector. In this configuration, where the display case 22 is removed from the base 15, the reflector 205 can be removed from the display case 22 for projection of images from the LCD panel 50 unto an overhead projector surface. An adapter cable (not shown) can be used to join the base 15 to the display case 22.

Figure 5:
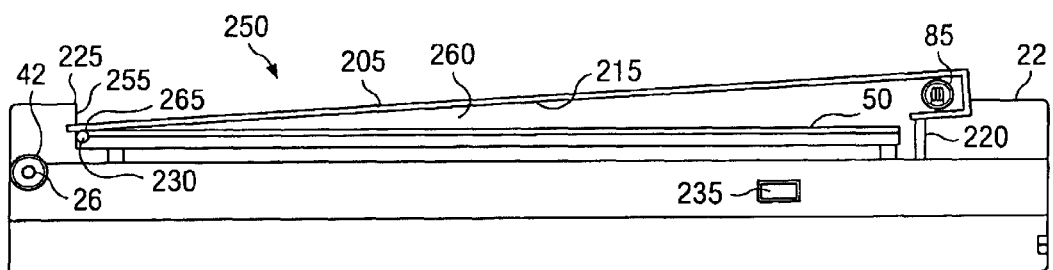
FIG. 5 depicts the active mode embodiment of a portable notebook computer in accordance with one embodiment of the present invention.

Turning now to FIG. 5, a side profile view of a portable notebook computer in the active mode is shown and denoted generally as 250. Again, no light guide 80 is present. As illustrated by profile 250, the reflector 205 has been inclined with respect to base 15 creating a substantially triangular shaped space 260 between the reflector 205 and LCD panel 50. In this particular embodiment, the weight of the display case 22 is reduced since no light guide 80 is being used to reflect light on the LCD panel 50.

As shown in FIG. 5, a point of contact 265 is created in active mode since the reflector 205 has been inclined sufficiently to make contact with LCD panel 50. Thus, all the light from light source 85 is reflected unto the bottom surface 215 of the reflector 205 and contained within space 260 providing for a substantially even distribution of light on the LCD panel 50.

While the display case 22 is shown in the CLOSED position with respect to the base 15, it should be understood by one skilled in the art that the display case 22 may also be OPENED in this configuration. Specifically, in one embodiment of the active mode configuration, when the user OPENS the display case 22 the reflector 205 is automatically inclined as shown.

A support 255 attaches to reflector 205 from case 22 at point 225. Support 255 extends to keep reflector 205 in place during use in the active mode. In this arrangement, one end of the reflector 205 extends outwardly beyond the display case 22 so the reflector is visible to the user.

As discussed in reference to FIG. 4, it should be understood by one skilled in the art that the display case 22 may optionally be removed from the base 15 and placed on a projector so that data or information on screen 25 can be seen as images on an overhead projector. In this configuration, where the display case 22 is removed from the base 15, the reflector 205 can be removed from the display case 22 for projection of images from the LCD panel 50 unto an overhead projector surface. An adapter cable (not shown) can be used to join the base 15 to the display case 22.

Figure 6:
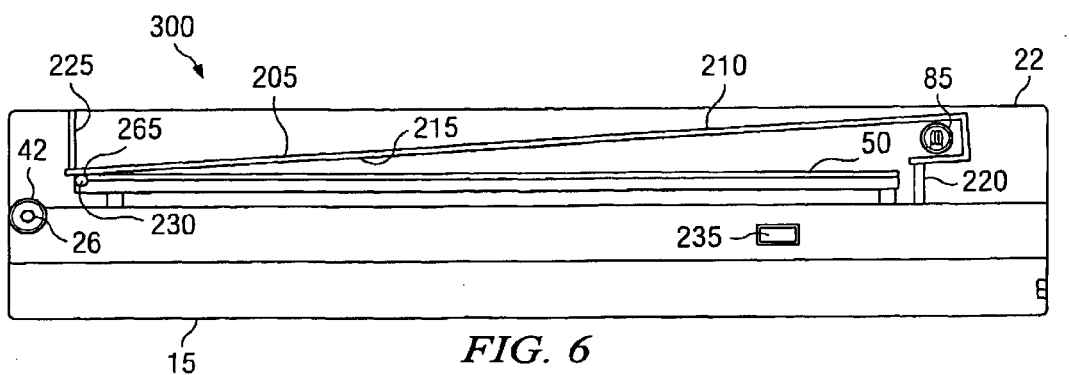
FIG. 6 depicts the active mode embodiment of a portable notebook computer in accordance with a second embodiment of the present invention.

Turning now to FIG. 6, a side profile view of a portable notebook computer in the active mode in accordance with a second embodiment of the invention is shown and denoted generally as 300. In this configuration, the display unit 20 has been enlarged to completely encase the reflector 205 inside the display case 22. Thus, no incline of the reflector 205 is externally visible to the user, yet the weight of the display unit 20 has been significantly reduced due to the absence of a light guide 80.

The phrase "circuitry" comprehends ASIC (Application Specific Integrated Circuits), PAL (Programmable Array Logic), PLA (Programmable Logic Array), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections can be ohmic, capacitive, direct or indirect, via intervening circuits or otherwise. Implementation is contemplated in discrete components or fully integrated circuits in silicon, gallium arsenide, or other electronic material families, as well as in optical-based or other technology-based forms and embodiments.

It should be understood that various embodiments of the invention can employ or be embodied in hardware, software or micro coded firmware. Process diagrams are also representative of flow diagrams for micro coded and software based embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A portable computer comprising:
   a base;
   a display unit displaceably coupled to said base, having an exterior display case with a medial opening in its top surface; and
   a reflector displaceably coupled to said display unit and disposed within said medial opening.

2. The portable computer in accordance with claim 1 wherein said reflector further comprises:
   a top surface; and
   a bottom surface positioned in a substantially coplanar arrangement to said top surface, said bottom surface coated with a light reflective finish.

3. The portable computer in accordance with claim 2 wherein said top surface of said reflector is movable to a position of being substantially flush with the top surface of said exterior display case.

4. The portable computer in accordance with claim 3 wherein said bottom surface is coated with a light reflective material that distributes light in a substantially even manner over said bottom surface.

5. The portable computer in accordance with claim 1 wherein said reflector is rotatably coupled at one end to said display unit by a hinge.

6. The portable computer in accordance with claim 5 wherein said hinge links with a mechanism adapted for rotational control.

7. The portable computer in accordance with claim 1 further comprising an LCD panel housed within said display unit and substantially coplanar to said reflector.

8. The portable computer in accordance with claim 7 wherein said reflector rotates within said display unit to a point of contact with said LCD panel.

9. The portable computer in accordance with claim 1 further comprising a light source coupled to another end of said reflector.

10. The portable computer in accordance with claim 1 further comprising a substantially tubular shaped light source positioned within said display unit proximal to said reflector.

11. A device adapted to communicably receive and display data from a computer, said device comprising:
    a case with a medial opening in its top surface;
    a liquid crystal display housed within said case; and
    a reflector displaceably coupled to said case and disposed within said medial opening.

12. The device in accordance with claim 11 wherein said reflector is rotatably coupled at one end to said device by a hinge.

13. The device in accordance with claim 12 further comprising a mechanism adapted to control rotation of said reflector about said hinge.

14. The device in accordance with claim 13 wherein said mechanism comprises a push-button coupled to said case.

15. The device in accordance with claim 11 further comprising a light source coupled to another end of said reflector.

16. The device in accordance with claim 11 wherein said reflector includes a bottom surface coated with a light reflective material that distributes light in a substantially even manner over said liquid crystal display.

17. The device in accordance with claim 11 further comprising a substantially tubular shaped light source positioned within said display unit proximal to said reflector.

18. In a portable computer system having a display unit and a base unit, a method of providing display backlight comprising the steps of:
   (a) providing an exterior case for said display unit adapted to reflect light from an inner surface thereof;
   (b) positioning a light source within said display unit proximal to said inner surface; and
   (c) reflecting light from said light source towards a display apparatus via said inner surface.

19. The method in accordance with claim 18 further including the step of opening said portable computer by rotating said display unit about said base unit.

20. In the method of claim 19, a method of adapting said exterior case to reflect light from an inner surface thereof, including the steps of:
   (a) providing a medial opening in a top surface of said exterior case: and (b) providing a reflector displaceably coupled to said exterior case and disposed within said medial opening.

21. The method in accordance with claim 20 further including the step of inclining said reflector with respect to said exterior case.

22. The method in accordance with claim 21 where a control mechanism within said portable computer inclines said reflector.

23. A method of projecting information onto a viewable surface from a computer having a liquid crystal display system, said liquid crystal display system having a frontal display surface and a counterpoised backlight surface, said method comprising the steps of:

providing a display unit communicably coupled to said computer;

providing an exterior case for said display unit;

housing said liquid crystal display system within said display unit such that said liquid crystal display system is operable to transmit light;

providing an opening in said exterior case parallel to and substantially aligned with the backlight surface of said liquid crystal display system; and casting light through said liquid crystal display system, via said opening, onto said viewing surface.

24. The method of claim 23 further including the step of providing a displaceable reflector, coupled to a light source, within said opening for the purpose of casting light through said liquid crystal display system.

25. The method of claim 23 wherein the step of casting light through said liquid crystal display via said opening further includes:

placing the opening in said exterior case in contact with an illumination source; and projecting an image of the display surface of said liquid crystal display system onto said viewable surface.

* * * * *